United States Patent [19]

Russ et al.

[11] Patent Number: 5,980,590
[45] Date of Patent: Nov. 9, 1999

[54] DYESTUFF MIXTURES OF WATER-SOLUBLE FIBER-REACTIVE AZO DYESTUFFS, PROCESSES FOR THEIR PREPARATION AND THEIR USE

[75] Inventors: Werner Hubert Russ, Flörsheim; Bengt-Thomas Gröbel, Niederems; Uwe Mrotzeck, Kelkheim, all of Germany

[73] Assignee: DyStar Texilfarben GmbH & Co. Deutschland KG, Germany

[21] Appl. No.: 08/871,032

[22] Filed: Jun. 9, 1997

Related U.S. Application Data

[63] Continuation of application No. 08/580,349, Dec. 28, 1995, abandoned.

[51] Int. Cl.⁶ .............................. D06P 1/382; D06P 1/384
[52] U.S. Cl. ..................................................... 8/549; 8/641
[58] Field of Search ........................................ 8/549, 641

[56] References Cited

U.S. PATENT DOCUMENTS

| | | | |
|---|---|---|---|
| 4,649,193 | 3/1987 | Meininger et al. | 534/622 |
| 4,725,675 | 2/1988 | Meininger et al. | 534/638 |
| 5,304,221 | 4/1994 | Schwarz et al. | |
| 5,399,182 | 3/1995 | Schwarz et al. | |
| 5,428,141 | 6/1995 | Herd et al. | |

FOREIGN PATENT DOCUMENTS

| | | |
|---|---|---|
| 1221360 | 5/1987 | Canada . |
| 0111288 | 6/1984 | European Pat. Off. . |
| 0094055 | 12/1986 | European Pat. Off. . |
| 0219741 | 4/1987 | European Pat. Off. . |
| 0545219 | 6/1993 | European Pat. Off. . |
| 0546372 | 6/1993 | European Pat. Off. . |
| 0576026 | 12/1993 | European Pat. Off. . |
| 0668328 | 8/1995 | European Pat. Off. . |
| 3-64372 | of 1989 | Japan . |

OTHER PUBLICATIONS

Database WPI, Section Ch, Week 9117, Derwent Publications Ltd., London GB; An 91–123025; Mar. 19, 1991 of JP 3–64372.

Primary Examiner—Margaret Einsmann
Attorney, Agent, or Firm—Connolly Bove Lodge & Hutz LLP

[57] ABSTRACT

Dyestuff mixtures of dyestuffs of the formulae (1) and (2) mentioned and defined below which give strong dyeings with a high color yield and very good build-up properties on material containing hydroxy and/or carboxamide groups, in particular fiber material, such as cellulose fiber material, wool and synthetic polyamide fibers, by the dyeing and printing processes customary for fiber-reactive dyestuffs are described.

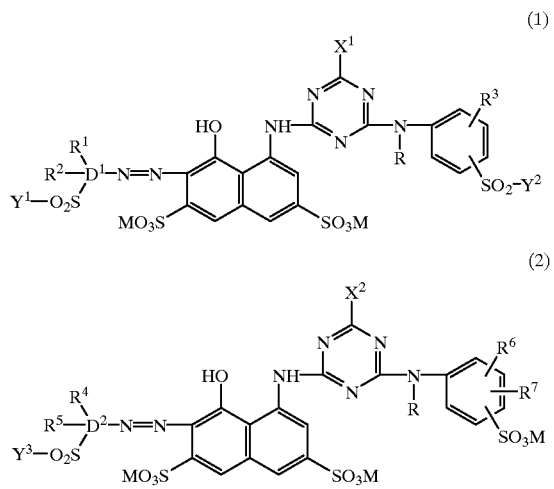

in which the variables are described in the specification.

10 Claims, No Drawings

DYESTUFF MIXTURES OF WATER-SOLUBLE FIBER-REACTIVE AZO DYESTUFFS, PROCESSES FOR THEIR PREPARATION AND THEIR USE

This application is a continuation of application Ser. No. 08/580,349 filed on Dec. 28, 1995 now abandoned.

The invention relates to the technical field of fiber-reactive azo dyestuffs.

U.S. Pat. No. 4,725,675 and European Patent Application Publication No. 0 094 055 disclose monoazo dyestuffs which contain a fiber-reactive radical from the vinyl-sulfone series and, as a further fiber-reactive radical, an amino-substituted chlorotriazinylamino radical. However, the dyestuffs described therein have certain deficiencies with regard to their use, such as, for example, too great a dependency of the color yield on varying dyeing parameters in the dyeing process, an inadequate solubility in an aqueous dyebath at higher dyestuff concentrations in the presence of electrolyte salts or an inadequate color build-up on cotton and, in particular, viscose (a good color build-up results from the ability of a dyestuff to produce the dyeing of correspondingly stronger color when increased dyestuff concentrations are used in the dyebath). The consequence of these deficiencies can be a poor reproducibility of the dyeings obtainable.

However, it is particularly important to obtain dyeings with a good color yield, i.e. dyeings of which the depth of color in relation to the amount of dyestuff employed is as high as possible, for example in comparison with other dyestuffs, because of the color property of the dyestuff itself (high extinction value) and because of the dyeing properties of this dyestuff, such as good exhaustion capacity and high fixing value. If mixtures of dyestuffs of a particular color yield are employed, the rule is that the color yield of this mixture results from the average of the sum of the color yields of the individual dyestuffs. The color yield of a mixture of, for example, two dyestuffs will then be lower than the color yield of that individual dyestuff having the higher color yield property in respect to the other individual dye-stuff.

With the present invention, it has now been found that the color yields of the dyestuff mixtures according to the invention described below are surprisingly significantly higher than the average of the sum of the color yields given by the individual dyestuffs of the dyestuff mixture. This synergistic effect furthermore manifests itself in improved build-up properties of the mixture according to the invention compared with the individual dyestuffs of the mixture.

The invention relates to dyestuff mixtures which comprise one or more, such as two or three, azo dyestuffs corresponding to the formula (1) and one or more, such as two or three, azo dyestuffs corresponding to the formula (2).

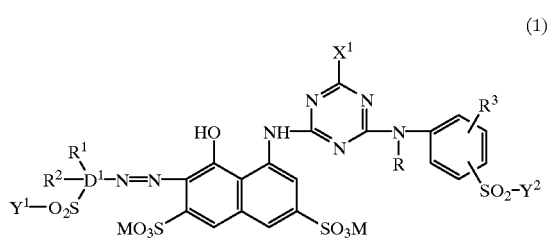
(1)

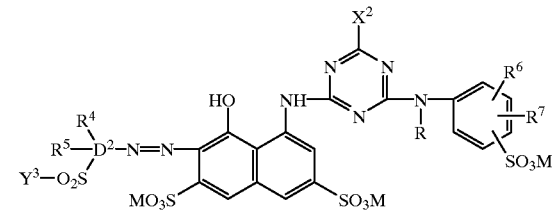
(2)

In these formulae:

M is hydrogen or an alkali metal, such as lithium, sodium or potassium, or the stoichiometric equivalent of an alkaline earth metal, such as of calcium, preferably hydrogen, sodium, potassium or lithium;

$D^1$ is the radical of a benzene or naphthalene nucleus, the azo group preferably being bonded in the 2-position in the case of the naphthalene nucleus;

$D^2$ has one of the meanings of $D^1$;

$R^1$ is hydrogen or alkyl having 1 to 4 carbon atoms, such as ethyl and, in particular, methyl, or alkoxy having 1 to 4 carbon atoms, such as ethoxy and, in particular, methoxy, if $D^1$ or $D^2$ is the radical of a benzene nucleus, or is hydrogen or sulfo if $D^1$ or $D^2$ is the radical of a naphthalene nucleus;

$R^2$ is hydrogen, alkyl having 1 to 4 carbon atoms, such as ethyl and, in particular, methyl, alkoxy having 1 to 4 carbon atoms, such as ethoxy and, in particular, methoxy, or sulfo, if $D^1$ or $D^2$ is the radical of a benzene nucleus, or is hydrogen or sulfo, if $D^1$ or $D^2$ is the radical of a naphthalene nucleus;

$R^3$ is hydrogen, alkyl having 1 to 4 carbon atoms, such as ethyl and, in particular, methyl, or alkoxy having 1 to 4 carbon atoms, such as ethoxy and, in particular, methoxy;

$R^4$ is hydrogen or alkyl having 1 to 4 carbon atoms, such as ethyl and, in particular, methyl, or alkoxy having 1 to 4 carbon atoms, such as ethoxy and, in particular, methoxy;

$R^5$ is hydrogen, alkyl having 1 to 4 carbon atoms, such as ethyl and, in particular, methyl, alkoxy having 1 to 4 carbon atoms, such as ethoxy and, in particular, methoxy, or sulfo;

$R^6$ is hydrogen, alkyl having 1 to 4 carbon atoms, such as ethyl and, in particular, methyl, or alkoxy having 1 to 4 carbon atoms, such as ethoxy and, in particular, methoxy;

$R^7$ is hydrogen, alkyl having 1 to 4 carbon atoms, such as ethyl and, in particular, methyl, alkoxy having 1 to 4 carbon atoms, such as ethoxy and, in particular, methoxy, or sulfo;

R is hydrogen or alkyl having 1 to 4 carbon atoms, such as ethyl and, in particular, methyl, preferably hydrogen;

$Y^1$ is vinyl, β-sulfatoethyl, β-thiosulfatoethyl or β-chloroethyl, preferably vinyl or β-sulfatoethyl;

$Y^2$ has one of the meanings of $Y^1$;

$Y^3$ has one of the meanings of $Y^1$;

$X^1$ is fluorine, bromine or chlorine, preferably fluorine, and in particular chlorine;

$X^2$ has one of the meanings of $X^1$; and the groups $-SO_2-Y^1$, $-SO_2-Y^2$ and $-SO_2-Y^3$ are in the meta- or para-position relative to the azo group on the benzene nucleus of $D^1$ and $D^2$ or are bonded in the meta- or para-position relative to the amino group.

The individual formula members in the formulae (1) and (2) and likewise in the formulae mentioned below can have meanings which are the same as one another or different from one another in the context of their definition.

In general, the azo dyestuff or dyestuffs of the formula (1) and the azo dyestuff or dyestuffs of the formula (2) are contained in the mixture in a mixing ratio of 90:10% by weight to 10:90% by weight, preferably in the ratio of 70:30% by weight to 30:70% by weight. They are particularly preferably contained in the mixture in a ratio of 55:45 to 45:55% by weight.

Radicals of the formulae $Y^1$—$O_2S$—$D^1$—$(R^1,R^2)$— and $Y^3$—$O_2S$—$D^2(R^4,R^5)$— of the azo dyestuffs of the formulae (1) and (2) are, for example, 3-(β-sulfatoethylsulfonyl)-phenyl, 4- (β.sulfatoethylsulfonyl)-phenyl, 2-methyl-5-(β-sulfatoethylsulfonyl)-phenyl, 2-methoxy-5-(β-sulfatoethylsulfonyl)-phenyl, 4-methyl-3-(β-sulfatoethylsulfonyl)-phenyl, 2,5-dimethyl-4-(β-sulfatoethylsulfonyl)-phenyl, 2,6-dimethyl-4-(β-sulfatoethylsulfonyl)-phenyl, 2-methoxy-4-(β-sulfatoethylsulfonyl)-phenyl, 4-methoxy-5-(β-sulfatoethylsulfonyl)-phenyl, 2-methoxy-5-methyl-4-(β-sulfatoethylsulfonyl)-phenyl, 2,4-dimethoxy-5-(β-sulfatoethylsulfonyl)-phenyl, 2,5-dimethoxy-4-(β-sulfatoethylsulfonyl)-phenyl, 6-(β-sulfatoethylsulfonyl)-1-sulfonaphth-2-yl and 8-(β-sulfatoethylsulfonyl)-6-sulfonaphth-2-yl, and of these in particular 4-(β-sulfatoethylsulfonyl)-phenyl, and derivatives of these radicals in which the β-sulfatoethylsulfonyl group is replaced by the vinylsulfonyl or β-thiosulfatoethylsulfonyl or β-chloroethylsulfonyl group.

Benzene radicals which contain the substituents $R^3$ and —$SO_2$—$Y^2$ in the formula (1) are, for example, 3-(β-sulfatoethylsulfonyl)-phenyl, 2-methoxy-5-(β-sulfatoethylsulfonyl)-phenyl, 2,5-dimethoxy-4-(β-sulfatoethylsulfonyl)-phenyl, 2-methoxy-4-(β-sulfatoethylsulfonyl)-phenyl, 4-methoxy-5-(β-sulfatoethylsulfonyl)-phenyl, 2,4-dimethoxy-5-(β-sulfatoethylsulfonyl)-phenyl, 2-methoxy-5-methyl-4-(β-sulfatoethylsulfonyl)-phenyl, 2-methyl-5-(β-sulfatoethylsulfonyl)-phenyl, 2,5-dimethyl-4-(β-sulfatoethylsulfonyl)-phenyl, 2,6-dimethyl-4-(β-sulfatoethylsulfonyl)-phenyl, 4-methyl-3-(β-sulfatoethylsulfonyl)-phenyl and, in particular, 4-(β-sulfatoethylsulfonyl)-phenyl, and the derivatives of these radicals in which the β-sulfatoethylsulfonyl group is replaced by the vinylsulfonyl or β-thiosulfatoethylsulfonyl or the β-chloroethylsulfonyl group.

Benzene radicals which contain a radical $R^6$, $R^7$ and a sulfo group —$SO_3M$ as substituents in the formula (2) are, for example, 2-methoxy-5-sulfo-phenyl, 2,5-dimethoxy-4-sulfo-phenyl, 2-methoxy-4-sulfo-phenyl, 4-methoxy-5-sulfo-phenyl, 2,4-dimethoxy-5-sulfo-phenyl, 2-methoxy-5-methyl-4-sulfo-phenyl, 2-methyl-5-sulfo-phenyl, 2,5-dimethyl-4-sulfo-phenyl, 2,6-dimethyl-4-sulfo-phenyl, 4-methyl-3-sulfo-phenyl and, in particular, 4-sulfo-phenyl and 3-sulfo-phenyl.

Preferably, in the formulae (1) and (2), the radicals $D^1$ and $D^2$ are benzene nuclei, and in the case where $D^1$ and $D^2$ are benzene nuclei, $R^1$, $R^2$, $R^4$ and $R^5$ are preferably each hydrogen, or $R^1$ and $R^4$ are each preferably hydrogen and $R^2$ and $R^5$ are each hydrogen or sulfo if $D^1$ and $D^2$ are naphthalene nuclei. Furthermore, $R^3$, $R^6$ and $R^7$ as well as R are each preferably hydrogen.

Above and below, a sulfo group is a group of the formula —$SO_3M$, a carboxy group is a group of the formula —COOM, a sulfato group is a group of the formula —$OSO_3M$ and a thiosulfato group is a group of the formula —S—$SO_3M$, in each case where M has the abovementioned meaning.

The dyestuff mixtures according to the invention can be in the form of a preparation in solid or in liquid (dissolved) form. In the solid form, they in general comprise the electrolyte salts customary with water-soluble and, in particular, fiber-reactive dyestuffs, such as sodium chloride, potassium chloride and sodium sulfate, and they can furthermore comprise the auxiliaries customary in commercial dyestuffs, such as buffer substances which are capable of establishing a pH in aqueous solution of between 3 and 7, such as sodium acetate, sodium borate, sodium bicarbonate, sodium dihydrogen phosphate and disodium hydrogen phosphate, small amounts of siccatives or, if they are present in liquid, aqueous solution (including the content of thickeners such as are customary in printing pastes), substances which guarantee the storage stability of these preparations, such as, for example, mold-preventing agents.

The dyestuff mixtures according to the invention are in general in the form of dyestuff powders having a content of 10 to 80% by weight, based on the dyestuff powder or the preparation, of an electrolyte salt, which is also called a standardizing agent. This dyestuff powder can furthermore comprise the buffer substances mentioned in a total amount of up to 5% by weight, based on the dyestuff powder. If the dyestuff mixtures according to the invention are present in aqueous solution, the total dyestuff content in these aqueous solutions is up to about 50% by weight, such as, for example, between 5 and 50% by weight, the electrolyte salt content in these aqueous solutions preferably being below 10% by weight, based on the aqueous solution; the aqueous solutions (liquid preparations) can as a rule comprise the buffer substances mentioned in an amount of up to 5% by weight, preferably up to 2% by weight.

The dyestuff mixtures according to the invention can be prepared in the customary manner, for example by mechanical mixing of the individual dyestuffs known from the abovementioned European Patent Application Publications in the required amounts or by synthesis by means of the customary diazotization and coupling reactions and reactions with the halotriazine component using corresponding mixtures of such components, in a manner with which the expert is familiar and with the amounts necessary for this. Thus, for example, a procedure can be followed in which one or more, such as two or three, azo compounds of the formula (3A) and one or more, such as two or three, azo compounds of the formula (3B)

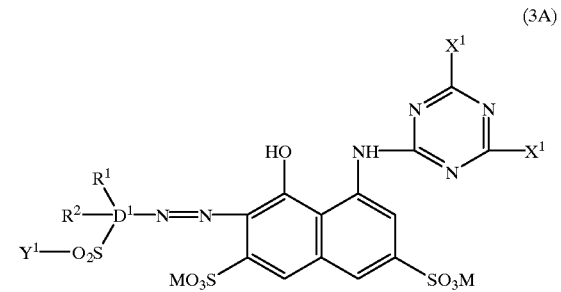

(3A)

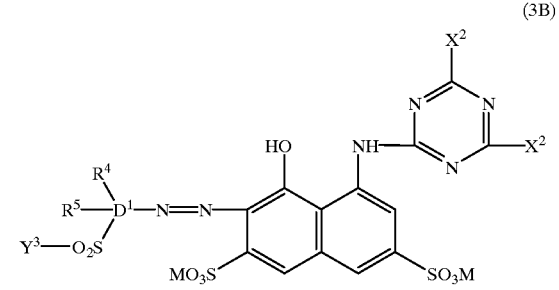

(3B)

in which M, $D^1$, $R^1$, $R^2$, $Y^1$, $D^2$, $R^4$, $R^5$, $Y^3$, $X^1$ and $X^2$ have the abovementioned meanings, are reacted in mixture with one or more, such as two or three, amino compounds of the formula (4A) and one or more, such as two or three, amino compounds of the formula (4B)

(4A)

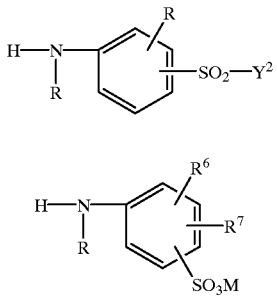

(4B)

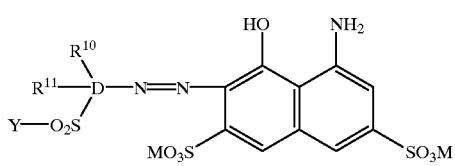

in which R, $R_3$, $Y^2$, $R^6$, $R^7$ and M have the abovementioned meanings, in a procedure known per se, such as, for example, at a temperature between 10 and 60° C., preferably between 20 and 30° C., and at a pH of between 2 and 8, preferably between 4 and 5, or in which one or more, such as two or three, azo compounds of the formula (5)

(5)

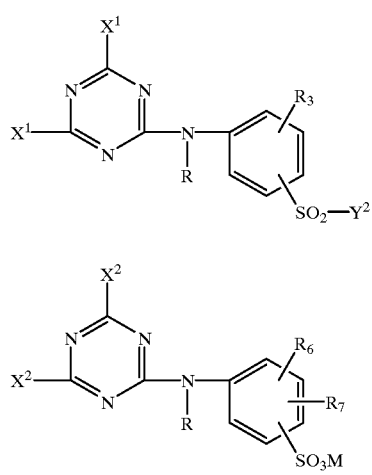

in which M has the abovementioned meaning, Y has one of the meanings of $Y^1$ or $Y^3$, $R^{10}$ has one of the meanings of $R^1$ or $R^4$, $R^{11}$ has one of the meanings of $R^2$ or $R^5$ and D has one of the meanings of $D^1$ or $D^2$, are reacted in mixture with one or more, such as two or three, compounds of the formula (6A) and one or more, such as two or three, compounds of the formula (6B)

(6A)

(6B)

in which $X^1$, $X^2$, R, $Y^2$, $R^3$, $R^6$, $R^7$ and M have the abovementioned meanings, in a procedure known per se, for example at a temperature between 20 and 60° C., preferably between 40 and 50° C., and at a pH of between 3 and 7, preferably between 4 and 5, or in which one or more, such as two or three, compounds of the formula (7A)

(7A)

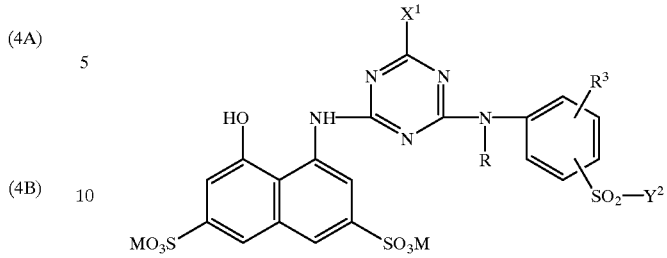

in which M, $X^1$, R, $R^3$ and $Y^2$ have the abovementioned meanings, and one or more, such as two or three, compounds of the formula (7B)

(7B)

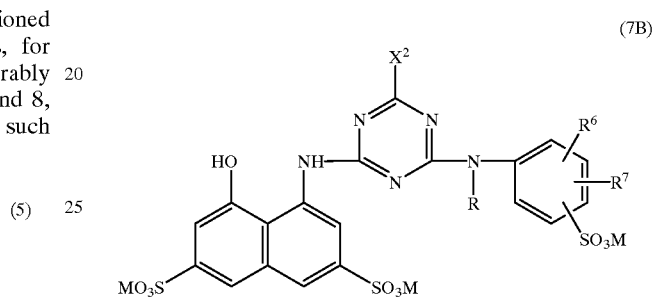

in which M, $X^2$, R, $R^6$ and $R^7$ have the abovementioned meanings, are coupled in mixture with one or more, such as two or three, diazotized amino compounds of the formula (8)

(8)

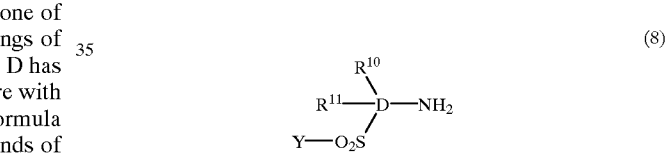

in which $R^{10}$, $R^{11}$, Y and D have the abovementioned meanings, in a procedure known per se, such as, for example, at a temperature between 0 and 30° C., preferably between 10 and 20° C., and at a pH of between 3 and 7.5, preferably between 4.5 and 6.5.

Starting compounds of the formula (8) are, for example, 3-(β-sulfatoethylsulfonyl)-aniline, 4-(β-sulfatoethylsulfonyl)-aniline, 2-methyl-5-(β-sulfatoethylsulfonyl)-aniline, 2-methoxy-5-(β-sulfatoethylsulfonyl)-aniline, 4-methyl-3-(β-sulfatoethylsulfonyl)-aniline, 2,5-dimethyl-4-(β-sulfatoethylsulfonyl)-aniline, 2,6-dimethyl-4-(β-sulfatoethylsulfonyl)-aniline, 2-methoxy-4-(β-sulfatoethylsulfonyl)-aniline, 4-methoxy-5-(β-sulfatoethylsulfonyl)-aniline, 2-methoxy-5-methyl-4-(β-sulfatoethylsulfonyl)-aniline, 2,4-dimethoxy-5-(β-sulfatoethylsulfonyl)-aniline, 2,5-dimethoxy-4-(β-sulfatoethylsulfonyl)-aniline, 6-(β-sulfatoethylsulfonyl)-1-sulfo-2-amino-naphthalene and 8-(β-sulfatoethylsulfonyl)-6-sulfo-2-amino-naphthalene, and of these in particular 4-(β-sulfatoethylsulfonyl)-aniline, and derivatives of these compounds in which the β-sulfatoethylsulfonyl group is replaced by the vinylsulfonyl or β-thiosulfatoethylsulfonyl or β-chloroethylsulfonyl group.

The starting compounds of the formulae (3A) and (3B) can be prepared by a known procedure by reacting an amino compound of the formula (8) with a 1-(dihalogeno-s-triazinyl)-amino-3,6-disulfo-8-naphthol compound, or reacting an azo compound of the formula (5) with a trihalo-s-triazine.

Starting compounds of the formulae (6A) and (6B) can be prepared by a procedure known per se by reacting a trihalo-s-triazine with an amino compound of the formula (9) or (10)

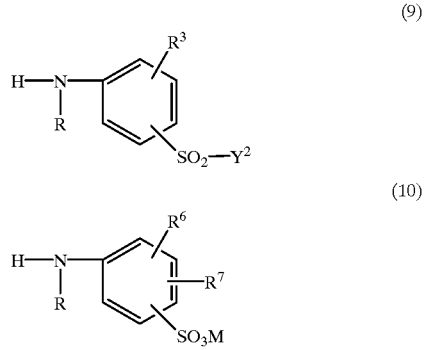

in which R, $R^3$, $Y^2$, $R^6$, $R^7$ and M have the abovementioned meanings.

Trihalo-s-triazine compounds are, in particular, trichloro-s-triazine (cyanuric chloride) and trifluoro-s-triazine (cyanuric fluoride).

Amino compounds of the formula (9) are, for example, 3-(β-sulfatoethylsulfonyl)-aniline, 2-methoxy-5-(β-sulfatoethylsulfonyl)-aniline, 2,5-dimethoxy-4-(β-sulfatoethylsulfonyl)-aniline, 2-methoxy-4-(β-sulfatoethylsulfonyl)-aniline, 4-methoxy-5-(β-sulfatoethylsulfonyl)-aniline, 2,4-dimethoxy-5-(β-sulfatoethylsulfonyl)-aniline, 2-methoxy-5-methyl-4-(β-sulfatoethylsulfonyl)-aniline, 2-methyl-5-(β-sulfatoethylsulfonyl) -aniline, 2,5-dimethyl-4-(β-sulfatoethylsulfonyl)-aniline, 2,6-dimethyl-4-(β-sulfatoethylsulfonyl)-aniline, 4-methyl-3-(β-sulfatoethylsulfonyl)-aniline and, in particular, 4-(β-sulfatoethylsulfonyl)-aniline and the derivatives of these compounds in which the β-sulfatoethylsulfonyl group is replaced by the vinylsulfonyl or β-thiosulfatoethylsulfonyl or the β-chloroethylsulfonyl group.

Amino compounds of the formula (10) are, for example, 2-methoxy-5-sulfo-aniline, 2,5-dimethoxy-4-sulfo-aniline, 2-methoxy-4-sulfo-aniline, 4-methoxy-5-sulfo-aniline, 2,4-dimethoxy-5-sulfo-aniline, 2-methoxy-5-methyl-4-sulfo-aniline, 2-methyl-5-sulfo-aniline, 2,5-dimethyl-4-sulfo-aniline, 2,6-dimethyl-4-sulfo-aniline, 4-methyl-3-sulfo-aniline and, in particular, 4-sulfo-aniline and 3-sulfo-aniline.

The dyestuff mixtures according to the invention prepared by a chemical route can be separated out from their synthesis solution by generally known methods, thus, for example, either by precipitation from the reaction medium by means of electrolytes, such as, for example, sodium chloride or potassium chloride, or by evaporation or spray drying of the reaction solution, it being possible for a buffer substance to be added to this reaction solution.

The dyestuff mixtures according to the invention can comprise further fiber-reactive dyestuffs, which serve to shade the dyestuff mixture, in an amount of up to 5% by weight. These "shading dyestuffs" can be added by customary mixing or else, if one or more of the components of the shading dyestuff are identical to the components of the dyestuffs of the formulae (1) and/or (2), can be prepared and introduced into the dyestuff mixture by a chemical route in the same reaction batch together with the synthesis described above for a dyestuff mixture according to the invention. Thus, to prepare a dyestuff mixture according to the invention having a content of a shading dyestuff with a particular chromophore, for example, those additional starting compounds which contain 4,6-disulfo-1-amino-8-naphthol or 2- or 3-amino-6-sulfo-8-naphthol or a 1-(aminophenyl)-3-carboxy- or -3-methyl-5-pyrazolone as a component instead of the 3,6-disulfo-1-amino-8-naphthol component of the dyestuffs (1) and (2) can be employed in the reaction batch.

The dyestuff mixtures according to the invention have valuable properties regarding their use. They are used for dyeing or printing materials containing hydroxy and/or carboxamide groups, for example in the form of sheet-like structures, such as paper and leather, or of films, such as, for example, of polyamide, or in bulk, such as, for example, polyamide and polyurethane, but in particular these materials in fiber form. The solutions of the dyestuff mixtures according to the invention obtained during synthesis of the azo compounds can also be used for dyeing directly as a liquid preparation, if appropriate after addition of a buffer substance and if appropriate also after concentration or dilution.

The present invention thus also relates to the use of the dyestuff mixtures according to the invention for dyeing or printing these materials and to processes for dyeing or printing such materials by procedures which are customary per se in which a dyestuff mixture according to the invention is employed as the coloring agent. The materials are preferably used in the form of fiber materials, in particular in the form of textile fibers, such as woven fabrics or yarns, such as in the form of hanks or wound packages.

Materials containing hydroxy groups are those of naturally occurring or synthetic origin, such as, for example, cellulose fiber materials or regenerated products thereof, and polyvinyl alcohols. Cellulose fiber materials are preferably cotton, but also other plant fibers, such as linen, hemp, jute and ramie fibers; regenerated cellulose fibers are, for example, viscose staple and filament viscose.

Materials containing carboxamide groups are, for example, synthetic and naturally occurring polyamides and polyurethanes, in particular in the form of fibers, for example wool and other animal hair, silk, leather, nylon 6,6, nylon 6, nylon 11 and nylon 4.

The dyestuff mixtures according to the invention can be applied to and fixed on the substrates mentioned, in particular the fiber materials mentioned, by the application techniques known for water-soluble dyestuffs, in particular for fiber-reactive dyestuffs.

Dyeings with very good color yields which are improved with respect to the individual dyestuffs are those obtained with them on cellulose fibers by the exhaustion process from a long liquor using the most diverse acid-binding agents and if appropriate neutral salts, such as sodium chloride or sodium sulfate. Dyeing is preferably carried out in an aqueous bath at temperatures between 40 and 105° C., if appropriate at a temperature of up to 130° C. under pressure, and if appropriate in the presence of customary dyeing auxiliaries. A procedure can be followed here in which the material is introduced into the hot bath, this is gradually heated to the desired dyeing temperature and the dyeing process is brought to completion at this temperature. If desired, the neutral salts which accelerate exhaustion of the dyestuffs can also be added to the bath only after the actual dyeing temperature has been reached.

Excellent color yields and a very good color build-up are likewise obtained by the padding process on cellulose fibers, it being possible for the dyeings to be fixed in the customary manner by batching at room temperature or elevated temperature, for example up to about 60° C., by steaming or with dry heat.

Strong prints with a good contour level and a clear white background are likewise obtained by the customary printing processes for cellulose fibers, which can be carried out in one phase—for example by printing with a printing paste comprising sodium bicarbonate or another acid-binding agent and subsequent steaming at 100 to 103° C.,—or in two phases—for example by printing with neutral or weakly acid printing ink and subsequent fixing either by passing the goods through a hot electrolyte-containing alkaline bath or by over-padding with an alkaline electrolyte-containing padding liquor and subsequent batching or steaming or dry heat treatment of the material over-padded under alkaline conditions. The printing result depends only little on the varying fixing conditions.

Hot air at 120 to 200° C. is used for fixing by means of dry heat by the customary thermofixing processes. In addition to customary steam at 101 to 103° C., it is also possible to employ superheated steam and pressurized steam at temperatures of up to 160° C.

The acid-binding agents and the agents which effect fixing of the dyestuffs of the dyestuff mixtures according to the invention to the cellulose fibers are, for example, water-soluble basic salts of the alkali metals and likewise alkaline earth metals with inorganic or organic acids, or compounds which liberate alkali under the influence of heat. The alkali metal hydroxides and alkali metal salts of weak to moderately strong inorganic or organic acids are to be mentioned in particular, the alkali metal compounds preferably meaning sodium and potassium compounds. Such acid-binding agents are, for example, sodium hydroxide, potassium hydroxide, sodium carbonate, sodium bicarbonate, potassium carbonate, sodium formate, sodium dihydrogen phosphate, disodium hydrogen phosphate, sodium trichloroacetate, water-glass or trisodium phosphate.

The dyestuff mixtures according to the invention are distinguished by a high fixing yield when used in dyeing and printing processes on cellulose fiber materials. After customary after-treatment by rinsing to remove non-fixed portions of dyestuff, the dyeings on cellulose show excellent wet-fastnesses, especially since non-fixed portions of dyestuff can easily be washed out because of their good solubility in cold water.

The dyeings and prints obtainable with the dyestuff mixtures according to the invention have clear shades; in particular, the dyeings and prints on cellulose fiber materials have a good lightfastness and very good wet-fastnesses, such as fastness to washing, milling, water, seawater, cross-dyeing and acid and alkaline perspiration, and furthermore a good fastness to pleating, fastness to ironing and fastness to rubbing.

The dyestuff mixtures according to the invention can furthermore also be used for fiber-reactive dyeing of wool. Wool which has been given an antifelting or low-felting treatment (cf., for example, H. Rath, Lehrbuch der Textilchemie [Textbook of Textile Chemistry], Springer-Verlag, 3rd edition (1972), pages 295–299, in particular treatment by the so-called Hercosett process (page 298); J. Soc. Dyers and Colourists 1972, 93–99, and 1975, 33–44) can also be dyed with very good fastness properties.

The process for dyeing on wool is carried out here by the customary and known dyeing procedure from an acid medium. Thus, for example, acetic acid and/or ammonium sulfate or acetic acid and ammonium acetate or sodium acetate can be added to the dyebath in order to obtain the desired pH. To achieve a usable levelness of the dyeing, it is advisable to add customary leveling auxiliaries, such as, for example, those based on a reaction product of cyanuric chloride with 3 times the molar amount of an aminobenzenesulfonic acid and/or of an aminonaphthalenesulfonic acid, or based on a reaction product of, for example, stearylamine with ethylene oxide. Thus, for example, the dyestuff mixture according to the invention is preferably first subjected to the exhaustion process from an acid dyebath with a pH of about 3.5 to 5.5, the pH being controlled, and, towards the end of the dyeing time, the pH is shifted into the neutral and, if appropriate, weakly alkaline range up to a pH of 8.5, in order to bring about a complete reactive bond between the dyestuffs of the dyestuff mixtures according to the invention and the fiber in particular to achieve good depths of color. At the same time, the dyestuff portion which has not been bonded reactively is dissolved off.

The procedure described here also applies to the production of dyeings on fiber materials of other naturally occurring polyamides or of synthetic polyamides and polyurethane. As a rule, the material to be dyed is introduced into the bath at a temperature of about 40° C. and is agitated therein for some time, the dyebath is then adjusted to the desired weakly acidic pH, preferably with acetic acid, and the actual dyeing is carried out at a temperature between 60 and 98° C. The dyeings can also be carried out at the boiling point or in closed dyeing apparatuses at temperatures of up to 106° C. Since the water-solubility of the dyestuff mixtures according to the invention is very good, they can also advantageously be employed in customary continuous dyeing processes. The tinctorial strength of the dyestuff mixture according to the invention is very high.

The dyestuff mixtures according to the invention give clear yellowish-tinged to bluish-tinged red dyeings on the materials mentioned, preferably fiber materials.

The following Examples serve to illustrate the invention. The parts are parts by weight and the percentage data are percentages by weight, unless stated otherwise. Parts by weight bear the same relation to parts by volume as the kilogram to the liter. The compounds described by their formulae in the Examples are shown in the form of the free acids; they are in general prepared and isolated in the form of their salts, preferably sodium or potassium salts, and used for dyeing in the form of their salts. The starting compounds mentioned in the form of the free acid in the following Examples, in particular the Tabular Examples, can likewise be employed in the synthesis as such or in the form of their salts, preferably alkali metal salts, such as sodium or potassium salts.

EXAMPLE 1 a) 190.1 parts of cyanuric chloride are introduced into a suspension of 319.2 parts of 1-amino-8-naphthol-3,6-disulfonic acid in 1000 parts of water and 300 parts of ice, while stirring thoroughly; the reaction batch is further stirred at between 0 and 15° C. and a pH of between 1.7 and 2.2, by means of sodium bicarbonate, for another four hours.

b) In a separate operation, the diazonium salt of the diazo component is prepared: 183 parts of a 38% strength aqueous sodium nitrite solution are added to a solution of pH 6.7 to 6.8 of 281.4 parts of 4-($\beta$-sulfatoethylsulfonyl)-aniline in 500 parts of water. This mixture is allowed to run into a mixture of 800 parts of crushed ice and 215 parts of 96% strength aqueous sulfuric acid, while stirring thoroughly. The mixture is stirred at a temperature of between 0° C. and 5° C. for a further hour and excess nitrous acid is then destroyed with a little amidosulfonic acid in the customary manner.

c) The primary condensation product, prepared under a), of cyanuric chloride and the aminonaphtholdisulfonic acid is combined with the diazonium salt solution described under b). For carrying out the coupling reaction, the strongly acidic reaction mixture is brought to a pH of 4.0 to 4.5 by means of sodium carbonate at a temperature of about 15° C. and the temperature is increased to 15 to 20° C. The mixture is further stirred at this pH and this temperature for a few more hours, until the coupling has ended.

d) The solution of the monoazo compound of c) is combined with a solution of pH 5.5 to 6.0 of 133.0 parts of 4-(β-sulfatoethylsulfonyl)-aniline and 86.5 parts of aniline-4-sulfonic acid in 640 parts of water. The pH is kept at about 5 and the reaction mixture is heated to a temperature of 60 to 65° C. in the course of one to two hours. A pH of between 6.0 and 6.5 is then established by means of sodium carbonate, the batch is clarified by filtration and the filtrate is spray dried.

About 1350 parts of a powder comprising electrolyte salt (chiefly sodium chloride and sodium sulfate), which comprises the sodium salt of the compound of the formula (A)

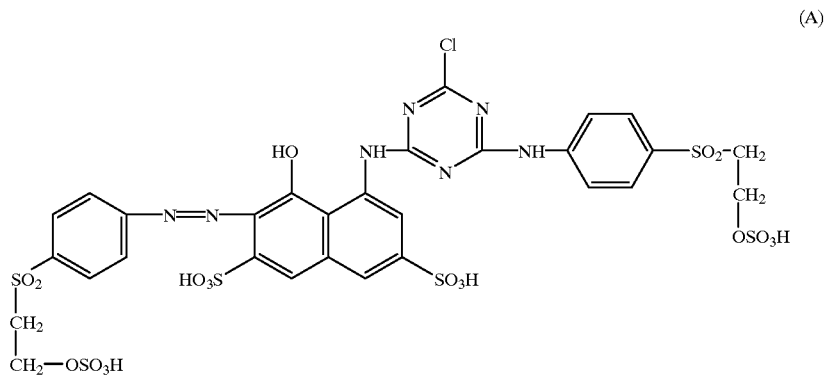

(A)

to the extent of about 35% and the sodium salt of the compound of the formula (B)

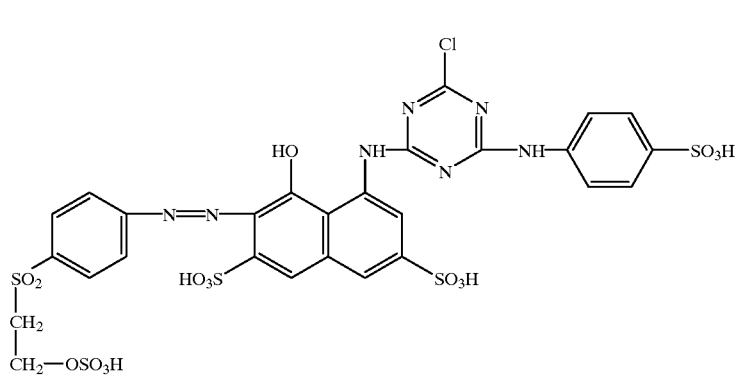

(B)

to the extent of about 35% are obtained. This mixture shows very good dyestuff properties and gives strong red dyeings and prints with very good fastness properties, of which above all the very good fastnesses to washing, light, alkali, acid, water, seawater, perspiration and rubbing can be singled out, on the materials mentioned in the description, such as cellulose fiber materials, in particular cotton and viscose, by the application and fixing methods customary in the art for fiber-reactive dyestuffs. The dyeings are furthermore distinguished by their high degree of fixing and good build-up from the cellulose materials.

EXAMPLE 2

19.4 parts of cyanuric chloride and 31.9 parts of 1-amino-8-naphthol-3,6-disulfonic acid are introduced rapidly into a mixture of 330 parts of water and 40 parts of ice, while stirring thoroughly, the batch is further stirred at a pH of between 1.5 and 2.0 and at a temperature of between 10 and 15° C. for about a further 3.5 hours and the solution of this primary condensation product is clarified by means of kieselguhr and filtration. The solution is combined with a suspension, prepared by the customary route by diazotization by means of sodium nitrite and sulfuric acid in an aqueous medium, of the diazonium salt of 41.1 parts of 6-(β-sulfatoethylsulfonyl)-2-amino-naphthalene-1-sulfonic acid, the strongly acidic coupling mixture is then brought to a pH of 4.0 to 4.5 by means of calcium carbonate at a temperature of about 10° C. and the mixture is further stirred at 10 to 14° C. and within this pH range for a few more hours. A solution of pH 5 of 16.1 parts of N-ethyl-4-(β-sulfatoethylsulfonyl)-aniline and 9.1 parts of aniline-3-sulfonic acid in 100 parts of water is then added, and the batch is stirred at a temperature of 18 to 22° C. for two to three hours, subsequently heated to 50 to 55° C. and kept at this temperature for 30 minutes, while keeping the pH constant at 4.0 to 4.5 by means of calcium carbonate. The mixture is subsequently stirred at 18 to 20° C. for a few more hours, the calcium sulfate is filtered off with suction and rinsed with water and the calcium ions are precipitated in this combined filtrate and wash water by means of sodium oxalate at a pH of 4.5 to 5.0 and a temperature of 30° C. After the mixture has been stirred for one hour, the precipitate is filtered off and the dyestuff mixture according to the invention is isolated from the filtrate by spray drying.

About 150 parts of a dark red powder which, in addition to electrolyte salts, is about 36% strength in the sodium salt of the compound of the formula (C)

of 0 to 10° C. for about three hours, until the reaction has ended. Thereafter, 320 parts of 1-amino-3,6-disulfo-8-naphthol are added, while stirring further, a pH of 4 to 5 is established with sodium carbonate and the second condensation reaction is brought to completion at a temperature of 45° C. and a pH of about 4.5 in the course of three to four hours.

The batch is then cooled to about 10° C. and the equivalent amount of the diazonium salt suspension described in Example 1b is added, while stirring further and maintaining a pH of 6 and a temperature of 10 to 15° C. The deep red

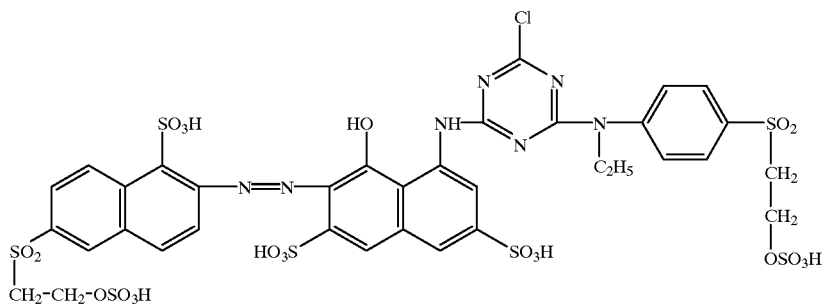

(C)

and about 36% strength in the sodium salt of the compound of the formula (D)

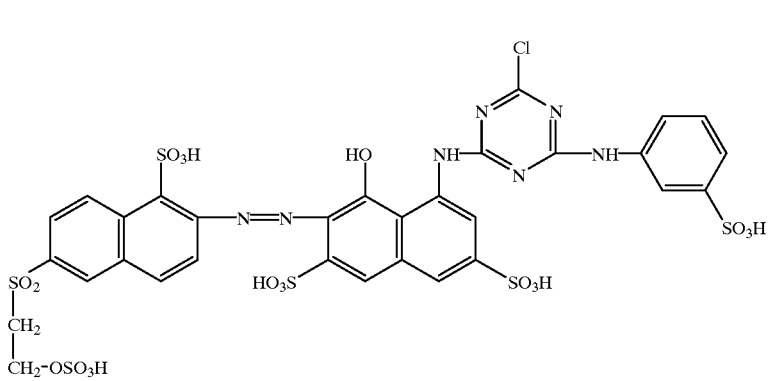

(D)

are obtained. This dyestuff mixture according to the invention has very good properties with regard to its use and gives strong red dyeings and prints with very good fastnesses to manufacturing processes and use, among which the lightfastness, the fastnesses to washing, perspiration, water and seawater and the resistance to chlorinated drinking water (chlorinated pool water) may be mentioned in particular, by the printing and dyeing procedures customary in the art for fiber-reactive dyestuffs, for example on cellulose fiber materials. The fixing ratio of this dyestuff mixture according to the invention on cellulose fiber materials is very high.

EXAMPLE 3

92 parts of aniline-3-sulfonic acid and 149 parts of 4-(β-sulfatoethylsulfonyl)-aniline are introduced into a suspension of 195 parts of cyanuric chloride in 1000 parts of water and 500 parts of ice, while stirring thoroughly. The batch is further stirred at a pH of 2.5 to 3 and a temperature solution obtained when the coupling reaction has ended is clarified by filtration and the dyestuff mixture is isolated from the filtrate by spray drying.

About 1350 parts of a red powder comprising electrolyte salt and with a content of about 35% of the sodium salt of the compound of the formula (A) described in Example 1 and about 35% of the sodium salt of the compound of the formula (D) described in Example 2 are obtained.

This dyestuff mixture according to the invention has very good properties with regard to its use and gives strong red dyeings and prints of good reproducibility and with good fastnesses to manufacturing processes and use, among which the fastnesses to washing may be mentioned in particular, by the printing and dyeing procedures customary in the art for fiber-reactive dyestuffs, for example on cellulose fiber materials. The fixing ratio of this dyestuff mixture according to the invention on cellulose fiber materials is very high and the color build-up of the dyeings very good.

EXAMPLES 4 to 105

Further dyestuff mixtures according to the invention of monoazo compounds of the formula (1A) and (2A)

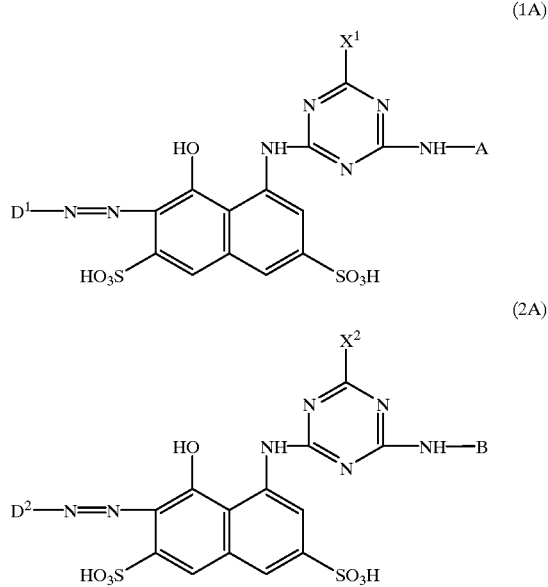

are described with the aid of their components in the following Tabular Examples. They can be prepared in the manner according to the invention either by mechanical mixing of the individual dyestuffs or else by a chemical route, for example analogously to one of the above Embodiment Examples, with the aid of their starting components (cyanuric chloride, cyanuric bromide or cyanuric fluoride, an amino compound $D^1$—$NH_2$ and $D^2$—$NH_2$ as the diazo component, 1-amino-8-naphthol-3,6-disulfonic acid as the coupling component and an amino compound of the formula A—$NH_2$ and B—$NH_2$). The dyestuff mixtures according to the invention have very good properties with regard to their use and give strong dyeings and prints with good fastness properties and a good color build-up in the color shade stated in the particular tabular example on the materials mentioned in the description, such as, in particular, cellulose fiber materials, by the application methods in dyeing and printing customary in the art, preferably by the application and fixing methods for fiber-reactive dyestuffs customary in the art.

The numerical ratios stated in the column WR indicate the weight ratio in percent of the dyestuff or dyestuffs of the formula (1A) to the dyestuff or dyestuffs of the formula (2A) in which the dyestuffs are present in the particular dyestuff mixture.

| | | Dyestuff (1A) | | Dyestuff (2A) | | | | |
|---|---|---|---|---|---|---|---|---|
| Ex. | Radical $D^1$ | Radical $X^1$ | Radical A | Radical $D^2$ | Radical $X^2$ | Radical B | WR | Color shade |
| 4 | 4-(β-sulfatoethyl-sulfonyl)-phenyl | chlorine | 3-(β-sulfatoethyl-sulfonyl)-phenyl | 4-β-sulfatoethyl-sulfonyl)-phenyl | chlorine | 4-sulfo-phenyl | 60:40 | red |
| 5 | 4-(β-sulfatoethyl-sulfonyl)-phenyl | chlorine | 4-(β-sulfatoethyl-sulfonyl)-phenyl | 4-(β-sulfatoethyl-sulfonyl)-phenyl | chlorine | 3-sulfo-phenyl | 55:45 | red |
| 6 | 4-(β-sulfatoethyl-sulfonyl)-phenyl | chlorine | 4-(β-sulfatoethyl-sulfonyl)-phenyl | 4-(β-sulfatoethyl-sulfonyl)-phenyl | chlorine | 2-sulfo-phenyl | 70:30 | red |
| 7 | 3-(β-sulfatoethyl-sulfonyl)-phenyl | chlorine | 4-(β-sulfatoethyl-sulfonyl)-phenyl | 3-(β-sulfatoethyl-sulfonyl)-phenyl | chlorine | 4-sulfo-phenyl | 70:30 | yellowish-tinged red |
| 8 | 3-(β-sulfatoethyl-sulfonyl)-phenyl | chlorine | 4-(β-sulfatoethyl-sulfonyl)-phenyl | 3-(β-sulfatoethyl-sulfonyl)-phenyl | chlorine | 3-sulfo-phenyl | 55:45 | yellowish-tinged red |
| 9 | 3-(β-sulfatoethyl-sulfonyl)-phenyl | chlorine | 3-(β-sulfatoethyl-sulfonyl)-phenyl | 3-(β-sulfatoethyl-sulfonyl)-phenyl | chlorine | 4-sulfo-phenyl | 55:45 | yellowish-tinged red |
| 10 | 3-(β-sulfatoethyl-sulfonyl)-phenyl | chlorine | 3-(β-sulfatoethyl-sulfonyl)-phenyl | 3-(β-sulfatoethyl-sulfonyl)-phenyl | chlorine | 3-sulfo-phenyl | 50:50 | yellowish-tinged red |
| 11 | 2-methoxy-5-(β-sulfatoethyl-sulfonyl)-phenyl | chlorine | 4-(β-sulfatoethyl-sulfonyl)-phenyl | 2-methoxy-5-(β-sulfatoethyl sulfonyl)-phenyl | chlorine | 4-sulfo-phenyl | 35:65 | bluish-tinged red |
| 12 | 2-methoxy-5-(β-sulfatoethyl-sulfonyl)-phenyl | chlorine | 4-(β-sulfatoethyl-sulfonyl)-phenyl | 2-methoxy-5-(β-sulfatoethyl sulfonyl)-phenyl | chlorine | 3-sulfo-phenyl | 35:65 | bluish-tinged red |
| 13 | 2-methoxy-5-(β-sulfatoethyl-sulfonyl)-phenyl | chlorine | 3-(β-sulfatoethyl-sulfonyl)-phenyl | 2-methoxy-5-(β-sulfatoethyl sulfonyl)-phenyl | chlorine | 4-sulfo-phenyl | 40:60 | bluish-tinged red |
| 14 | 2-methoxy-5-(β-sulfatoethyl-sulfonyl)-phenyl | chlorine | 3-(β-sulfatoethyl-sulfonyl)-phenyl | 2-methoxy-5-(β-sulfatoethyl sulfonyl)-phenyl | chlorine | 3-sulfo-phenyl | 40:60 | bluish-tinged red |
| 15 | 4-methoxy-3-(β sulfatoethyl-sulfonyl)-phenyl | chlorine | 4-(β-sulfatoethyl-sulfonyl)-phenyl | 4-methoxy-3-(β-sulfatoethyl sulfonyl)-phenyl | chlorine | 4-sulfo-phenyl | 40:60 | bluish-tinged red |

-continued

|     | Dyestuff (1A) | | | Dyestuff (2A) | | | | |
| --- | --- | --- | --- | --- | --- | --- | --- | --- |
| Ex. | Radical $D^1$ | Radical $X^1$ | Radical A | Radical $D^2$ | Radical $X^2$ | Radical B | WR | Color shade |
| 16 | 4-methoxy-3-(β-sulfatoethyl-sulfonyl)-phenyl | chlorine | 4-(β-sulfatoethyl-sulfonyl)-phenyl | 4-methoxy-3-(β-sulfatoethyl sulfonyl)-phenyl | chlorine | 3-sulfo-phenyl | 40:60 | bluish-tinged red |
| 17 | 4-methoxy-3-(β-sulfatoethyl-sulfonyl)-phenyl | chlorine | 3-(β-sulfatoethyl-sulfonyl)-phenyl | 4-methoxy-3-(β-sulfatoethyl sulfonyl)-phenyl | chlorine | 4-sulfo-phenyl | 40:60 | bluish-tinged red |
| 18 | 4-methoxy-3-(β-sulfatoethyl-sulfonyl)-phenyl | chlorine | 3-(β-sulfatoethyl-sulfonyl)-phenyl | 4-methoxy-3-(β-sulfatoethyl sulfonyl)-phenyl | chlorine | 3-sulfo-phenyl | 40:60 | bluish-tinged red |
| 19 | 2,5-dimethoxy-4-(β-sulfatoethyl-sulfonyl)-phenyl | chlorine | 4-(β-sulfatoethyl-sulfonyl)-phenyl | 2,5-dimethoxy-4-(β-sulfatoethyl-sulfonyl)-phenyl | chlorine | 4-sulfo-phenyl | 30:70 | violet |
| 20 | 2,5-dimethoxy-4-(β-sulfatoethyl-sulfonyl)-phenyl | chlorine | 4-(β-sulfatoethyl-sulfonyl)-phenyl | 2,5-dimethoxy-4-(β-sulfatoethyl-sulfonyl)-phenyl | chlorine | 3-sulfo-phenyl | 30:70 | violet |
| 21 | 2,5-dimethoxy-4-(β-sulfatoethyl-sulfonyl)-phenyl | chlorine | 3-(β-sulfatoethyl-sulfonyl)-phenyl | 2,5-dimethoxy-4-(β-sulfatoethyl-sulfonyl)-phenyl | chlorine | 4-sulfo-phenyl | 30:70 | violet |
| 22 | 2,5-dimethoxy-4-(β-sulfatoethyl-sulfonyl)-phenyl | chlorine | 3-(β-sulfatoethyl-sulfonyl)-phenyl | 2,5-dimethoxy-4-(β-sulfatoethyl-sulfonyl)-phenyl | chlorine | 3-sulfo-phenyl | 30:70 | violet |
| 23 | 2-methoxy-5-methyl-4-(β sulfatoethyl-sulfonyl)-phenyl | chlorine | 4-(β-sulfatoethyl-sulfonyl)-phenyl | 2-methoxy-5-methyl-4-(β-sulfatoethyl sulfonyl)-phenyl | chlorine | 4-sulfo-phenyl | 30:70 | red-violet |
| 24 | 2-methoxy-5-methyl-4-(β sulfatoethyl-sulfonyl)-phenyl | chlorine | 4-(β-sulfatoethyl-sulfonyl)-phenyl | 2-methoxy-5-methyl-4-(β-sulfatoethyl sulfonyl)-phenyl | chlorine | 3-sulfo-phenyl | 30:70 | red-violet |
| 25 | 2-methoxy-5-methyl-4-(β sulfatoethyl-sulfonyl)-phenyl | chlorine | 3-(β-sulfatoethyl-sulfonyl)-phenyl | 2-methoxy-5-methyl-4-(β-sulfatoethyl sulfonyl)-phenyl | chlorine | 4-sulfo-phenyl | 30:70 | red-violet |
| 26 | 2-methoxy-5-methyl-4-(β sulfatoethyl-sulfonyl)-phenyl | chlorine | 3-(β-sulfatoethyl-sulfonyl)-phenyl | 2-methoxy-5-methyl-4-(β-sulfatoethyl sulfonyl)-phenyl | chlorine | 3-sulfo-phenyl | 30:70 | red-violet |
| 27 | 6-(β-sulfatoethyl-sulfonyl)-1-sulfo-naphth-2-yl | chlorine | 4-(β-sulfatoethyl-sulfonyl)-phenyl | 6-(β-sulfatoethyl-sulfonyl)-1-sulfo-naphth-2-yl | chlorine | 4-sulfo-phenyl | 35:65 | bluish-tinged red |
| 28 | 6-(β-sulfatoethyl-sulfonyl)-1-sulfo-naphth-2-yl | chlorine | 4-(β-sulfatoethyl-sulfonyl)-phenyl | 6-(β-sulfatoethyl-sulfonyl)-1-sulfo-naphth-2-yl | chlorine | 3-sulfo-phenyl | 35:65 | bluish-tinged red |
| 29 | 6-(β-sulfatoethyl-sulfonyl)-1-sulfo-naphth-2-yl | chlorine | 3-(β-sulfatoethyl-sulfonyl)-phenyl | 6-(β-sulfatoethyl-sulfonyl)-1-sulfo-naphth-2-yl | chlorine | 4-sulfo-phenyl | 40:60 | bluish-tinged red |
| 30 | 6-(β-sulfatoethyl-sulfonyl)-1-sulfo-naphth-2-yl | chlorine | 3-(β-sulfatoethyl-sulfonyl)-phenyl | 6-(β-sulfatoethyl-sulfonyl)-1-sulfo-naphth-2-yl | chlorine | 3-sulfo-phenyl | 40:60 | bluish-tinged red |
| 31 | 4-vinylsulfonyl-phenyl | chlorine | 4-(β-sulfatoethyl-sulfonyl)-phenyl | 4-vinylsulfon-yl-phenyl | chlorine | 3-sulfo-phenyl | 50:50 | red |
| 32 | 4-vinylsulfonyl-phenyl | chlorine | 3-(β-sulfatoethyl-sulfonyl)-phenyl | 4-vinylsulfon-yl-phenyl | chlorine | 4-sulfo-phenyl | 50:50 | red |
| 33 | 4-vinylsulfonyl-phenyl | chlorine | 4-vinylsulfonyl-phenyl | 4-vinylsulfon-yl-phenyl | chlorine | 3-sulfo-phenyl | 50:50 | red |
| 34 | 4-vinylsulfonyl-phenyl | chlorine | 3-vinylsulfonyl-phenyl | 4-vinylsulfon-yl-phenyl | chlorine | 4-sulfo-phenyl | 50:50 | red |
| 35 | 3-vinylsulfonyl-phenyl | chlorine | 4-(β-sulfatoethyl-sulfonyl)-phenyl | 3-vinylsulfon-yl-phenyl | chlorine | 3-sulfo-phenyl | 60:40 | yellowish-tinged red |

-continued

| | | Dyestuff (1A) | | | Dyestuff (2A) | | | |
|---|---|---|---|---|---|---|---|---|
| Ex. | Radical $D^1$ | Radical $X^1$ | Radical A | Radical $D^2$ | Radical $X^2$ | Radical B | WR | Color shade |
| 36 | 3-vinylsulfonyl-phenyl | chlorine | 3-(β-sulfatoethyl-sulfonyl)-phenyl | 3-vinylsulfon-yl-phenyl | chlorine | 4-sulfo-phenyl | 60:40 | yellowish-tinged red |
| 37 | 3-vinylsulfonyl-phenyl | chlorine | 4-vinylsulfonyl-phenyl | 3-vinylsulfon-yl-phenyl | chlorine | 3-sulfo-phenyl | 40:60 | yellowish-tinged red |
| 38 | 3-vinylsulfonyl-phenyl | chlorine | 3-vinylsulfonyl-phenyl | 3-vinylsulfon-yl-phenyl | chlorine | 3-sulfo-phenyl | 40:60 | yellowish-tinged red |
| 39 | 3-(β-thiosulfato-ethylsulfonyl)-phenyl | chlorine | 4-(β-sulfatoethyl-sulfonyl)-phenyl | 3-(β-thiosulfato-ethylsulfon-yl)-phenyl | chlorine | 4-sulfo-phenyl | 50:50 | yellowish-tinged red |
| 40 | 3-(β-thiosulfato-ethylsulfonyl)-phenyl | chlorine | 4-(β-sulfatoethyl-sulfonyl)-phenyl | 3-(β-thiosulfato-ethylsulfon-yl)-phenyl | chlorine | 3-sulfo-phenyl | 50:50 | yellowish-tinged red |
| 41 | 4-(β-thiosulfato-ethylsulfonyl)-phenyl | chlorine | 3-(β-thio-sulfatoethyl-sulfonyl)-phenyl | 4-(β-thiosulfato-ethylsulfon-yl)-phenyl | chlorine | 4-sulfo-phenyl | 50:50 | red |
| 42 | 4-(β-thiosulfato-ethylsulfonyl)-phenyl | chlorine | 3-(β-thio-sulfatoethyl-sulfonyl)-phenyl | 4-(β-thiosulfato-ethylsulfon-yl)-phenyl | chlorine | 3-sulfo-phenyl | 50:50 | red |
| 43 | 4-(β-sulfatoethyl-sulfonyl)-phenyl | chlorine | 2-methoxy-5-(β-sulfato-ethylsulfonyl)-phenyl | 4-(β-sulfatoethyl-sulfonyl)-phenyl | chlorine | 3-sulfo-phenyl | 30:70 | red |
| 44 | 4-(β-sulfatoethyl-sulfonyl)-phenyl | chlorine | 2-methoxy-5-(β-sulfato-ethylsulfonyl)-phenyl | 4-(β-sulfatoethyl-sulfonyl)-phenyl | chlorine | 4-sulfo-phenyl | 30:70 | red |
| 45 | 3-(β-sulfatoethyl-sulfonyl)-phenyl | chlorine | 2-methoxy-5-(β-sulfato-ethylsulfonyl)-phenyl | 3-(β-sulfatoethyl-sulfonyl)-phenyl | chlorine | 3-sulfo-phenyl | 30:70 | red |
| 46 | 3-(β-sulfatoethyl-sulfonyl)-phenyl | chlorine | 2-methoxy-5-(β-sulfato-ethylsulfonyl)-phenyl | 3-(β-sulfatoethyl-sulfonyl)-phenyl | chlorine | 4-sulfo-phenyl | 30:70 | red |
| 47 | 4-(β-sulfatoethyl-sulfonyl)-phenyl | fluorine | 4-(β-(sulfato-ethylsulfonyl)-phenyl | 4-(β-sulfatoethyl-sulfonyl)-phenyl | fluorine | 4-sulfo-phenyl | 30:70 | red |
| 48 | 4-(β-sulfatoethyl-sulfonyl)-phenyl | fluorine | 4-(β-(sulfato-ethylsulfonyl)-phenyl | 4-(β-sulfatoethyl-sulfonyl)-phenyl | fluorine | 3-sulfo-phenyl | 30:70 | red |
| 49 | 4-(β-sulfatoethyl-sulfonyl)-phenyl | fluorine | 3-(β-(sulfato-ethylsulfonyl)-phenyl | 4-(β-sulfatoethyl-sulfonyl)-phenyl | fluorine | 4-sulfo-phenyl | 30:70 | red |
| 50 | 4-(β-sulfatoethyl-sulfonyl)-phenyl | fluorine | 3-(β-(sulfato-ethylsulfonyl)-phenyl | 4-(β-sulfatoethyl-sulfonyl)-phenyl | fluorine | 3-sulfo-phenyl | 30:70 | red |
| 51 | 3-(β-sulfatoethyl-sulfonyl)-phenyl | fluorine | 4-(β-(sulfato-ethylsulfonyl)-phenyl | 3-(β-sulfatoethyl-sulfonyl)-phenyl | fluorine | 4-sulfo-phenyl | 30:70 | yellowish-tinged red |
| 52 | 3-(β-sulfatoethyl-sulfonyl)-phenyl | fluorine | 4-(β-(sulfato-ethylsulfonyl)-phenyl | 3-(β-sulfatoethyl-sulfonyl)-phenyl | fluorine | 3-sulfo-phenyl | 30:70 | yellowish-tinged red |
| 53 | 3-(β-sulfatoethyl-sulfonyl)-phenyl | fluorine | 3-(β-(sulfato-ethylsulfonyl)-phenyl | 3-(β-sulfatoethyl-sulfonyl)-phenyl | fluorine | 4-sulfo-phenyl | 30:70 | yellowish-tinged red |
| 54 | 3-(β-sulfatoethyl-sulfonyl)-phenyl | fluorine | 3-(β-(sulfato-ethylsulfonyl)-phenyl | 3-(β-sulfatoethyl-sulfonyl)-phenyl | fluorine | 3-sulfo-phenyl | 30:70 | yellowish-tinged red |

-continued

| | Dyestuff (1A) | | | Dyestuff (2A) | | | | |
| --- | --- | --- | --- | --- | --- | --- | --- | --- |
| Ex. | Radical $D^1$ | Radical $X^1$ | Radical A | Radical $D^2$ | Radical $X^2$ | Radical B | WR | Color shade |
| 55 | 4-(β-sulfatoethyl-sulfonyl)-phenyl | chlorine | 4-(β-(sulfato-ethylsulfonyl)-phenyl | 4-(β-sulfatoethyl-sulfonyl)-phenyl | fluorine | 4-sulfo-phenyl | 40:60 | red |
| 56 | 4-(β-sulfatoethyl-sulfonyl)-phenyl | chlorine | 4-(β-(sulfato-ethylsulfonyl)-phenyl | 4-(β-sulfatoethyl-sulfonyl)-phenyl | fluorine | 3-sulfo-phenyl | 60:40 | red |
| 57 | 4-(β-sulfatoethyl-sulfonyl)-phenyl | chlorine | 3-(β-(sulfato-ethylsulfonyl)-phenyl | 4-(β-sulfatoethyl-sulfonyl)-phenyl | fluorine | 4-sulfo-phenyl | 60:40 | red |
| 58 | 4-(β-sulfatoethyl-sulfonyl)-phenyl | chlorine | 3-(β-(sulfato-ethylsulfonyl)-phenyl | 4-(β-sulfatoethyl-sulfonyl)-phenyl | fluorine | 3-sulfo-phenyl | 60:40 | red |
| 59 | 3-(β-sulfatoethyl-sulfonyl)-phenyl | chlorine | 4-(β-(sulfato-ethylsulfonyl)-phenyl | 3-(β-sulfatoethyl-sulfonyl)-phenyl | fluorine | 4-sulfo-phenyl | 60:40 | yellowish-tinged red |
| 60 | 3-(β-sulfatoethyl-sulfonyl)-phenyl | chlorine | 4-(β-(sulfato-ethylsulfonyl)-phenyl | 3-(β-sulfatoethyl-sulfonyl)-phenyl | fluorine | 3-sulfo-phenyl | 60:40 | yellowish-tinged red |
| 61 | 3-(β-sulfatoethyl-sulfonyl)-phenyl | chlorine | 3-(β-(sulfato-ethylsulfonyl)-phenyl | 3-(β-sulfatoethyl-sulfonyl)-phenyl | fluorine | 4-sulfo-phenyl | 50:50 | yellowish-tinged red |
| 62 | 3-(β-sulfatoethyl-sulfonyl)-phenyl | chlorine | 3-(β-(sulfato-ethylsulfonyl)-phenyl | 3-(β-sulfatoethyl-sulfonyl)-phenyl | fluorine | 3-sulfo-phenyl | 50:50 | yellowish-tinged red |
| 63 | 4-(β-sulfatoethyl-sulfonyl)-phenyl | chlorine | 4-(β-(sulfato-ethylsulfonyl)-phenyl | 4-(vinyl-sulfonyl)-phenyl | fluorine | 4-sulfo-phenyl | 65:35 | red |
| 64 | 4-(β-sulfatoethyl-sulfonyl)-phenyl | chlorine | 4-(β-(sulfato-ethylsulfonyl)-phenyl | 4-(vinyl-sulfonyl)-phenyl | fluorine | 3-sulfo-phenyl | 65:35 | red |
| 65 | 4-(β-sulfatoethyl-sulfonyl)-phenyl | chlorine | 3-(sulfato-ethylsulfonyl)-phenyl | 4-(vinyl-sulfonyl)-phenyl | fluorine | 4-sulfo-phenyl | 50:50 | red |
| 66 | 4-(β-sulfatoethyl-sulfonyl)-phenyl | chlorine | 3-(sulfato-ethylsulfonyl)-phenyl | 4-(vinyl-sulfonyl)-phenyl | fluorine | 3-sulfo-phenyl | 50:50 | red |
| 67 | 3-(β-sulfatoethyl-sulfonyl)-phenyl | chlorine | 4-(β-(sulfato-ethylsulfonyl)-phenyl | 2-methoxy-5-(vinylsulfonyl)-phenyl | chlorine | 4-sulfo-phenyl | 40:60 | bluish-tinged red |
| 68 | 3-(β-sulfatoethyl-sulfonyl)-phenyl | chlorine | 4-(β-(sulfato-ethylsulfonyl)-phenyl | 2-methoxy-5-(vinylsulfonyl)-phenyl | chlorine | 3-sulfo-phenyl | 40:60 | bluish-tinged red |
| 69 | 3-(β-sulfatoethyl-sulfonyl)-phenyl | chlorine | 3-(β-(sulfato-ethylsulfonyl)-phenyl | 2-methoxy-5-(vinylsulfonyl)-phenyl | chlorine | 4-sulfo-phenyl | 40:60 | bluish-tinged red |
| 70 | 3-(β-sulfatoethyl-sulfonyl)-phenyl | chlorine | 3-(β-(sulfato-ethylsulfonyl)-phenyl | 2-methoxy-5-(vinylsulfonyl)-phenyl | chlorine | 3-sulfo-phenyl | 40:60 | bluish-tinged red |
| 71 | 4-(β-sulfatoethyl-sulfonyl)-phenyl | chlorine | 4-(β-(sulfato-ethylsulfonyl)-phenyl | 2-(vinyl-sulfonyl)-phenyl | fluorine | 4-sulfo-phenyl | 65:35 | red |
| 72 | 4-(β-sulfatoethyl-sulfonyl)-phenyl | chlorine | 4-(β-(sulfato-ethylsulfonyl)-phenyl | 2-(vinyl-sulfonyl)-phenyl | fluorine | 3-sulfo-phenyl | 65:35 | red |
| 73 | 4-(β-sulfatoethyl-sulfonyl)-phenyl | chlorine | 3-(sulfato-ethyl-sulfonyl)-phenyl | 2-(vinyl-sulfonyl)-phenyl | fluorine | 4-sulfo-phenyl | 60:40 | red |

-continued

| | Dyestuff (1A) | | | Dyestuff (2A) | | | | |
|---|---|---|---|---|---|---|---|---|
| Ex. | Radical $D^1$ | Radical $X^1$ | Radical A | Radical $D^2$ | Radical $X^2$ | Radical B | WR | Color shade |
| 74 | 4-(β-sulfatoethyl-sulfonyl)-phenyl | chlorine | 3-(sulfato-ethyl-sulfonyl)-phenyl | 2-(vinyl-sulfonyl)-phenyl | fluorine | 3-sulfo-phenyl | 60:40 | red |
| 75 | 3-(β-sulfatoethyl-sulfonyl)-phenyl | chlorine | 4-(β-sulfato-ethylsulfonyl)-phenyl | 2-methoxy-5-(vinylsulfonyl)-phenyl | fluorine | 4-sulfo-phenyl | 50:50 | bluish-tinged red |
| 76 | 3-(β-sulfatoethyl-sulfonyl)-phenyl | chlorine | 4-(β-sulfato-ethylsulfonyl)-phenyl | 2-methoxy-5-(vinylsulfonyl)-phenyl | fluorine | 3-sulfo-phenyl | 50:50 | bluish-tinged red |
| 77 | 3-(β-sulfatoethyl-sulfonyl)-phenyl | chlorine | 3-(sulfato-ethylsulfonyl)-phenyl | 2-methoxy-5-(vinylsulfonyl)-phenyl | fluorine | 4-sulfo-phenyl | 50:50 | bluish-tinged red |
| 78 | 3-(β-sulfatoethyl-sulfonyl)-phenyl | chlorine | 3-(sulfato-ethylsulfonyl)-phenyl | 2-methoxy-5-(vinylsulfonyl)-phenyl | fluorine | 3-sulfo-phenyl | 50:50 | bluish-tinged red |
| 79 | 3-(β-sulfato-ethylsulfonyl)-phenyl + 3-(vinylsulfonyl)-phenyl | chlorine | 4-(β-sulfato-ethylsulfon-yl)-phenyl | 3-(β-sulfatoethyl-sulfonyl)-phenyl | chlorine | 3-sulfo-phenyl | 70:30 | yellowish-tinged red |
| 80 | 3-(β-sulfato-ethylsulfonyl)-phenyl + 3-(vinylsulfonyl)-phenyl | chlorine | 4-(β-sulfato-ethylsulfon-yl)-phenyl | 3-(β-sulfatoethyl-sulfonyl)-phenyl + 3-(vinylsulfonyl)-phenyl | chlorine | 3-sulfo-phenyl | 70:30 | yellowish-tinged red |
| 81 | 3-(β-sulfato-ethylsulfonyl)-phenyl | chlorine | 4-(β-sulfato-ethylsulfon-yl)-phenyl | 3-(β-sulfatoethyl-sulfonyl)-phenyl + 3-(vinylsulfonyl)-phenyl | chlorine | 3-sulfo-phenyl | 65:35 | yellowish-tinged red |
| 82 | 3-(β-sulfato-ethylsulfonyl)-phenyl | chlorine | 4-(β-sulfato-ethylsulfonyl)-phenyl + 4-(vinylsulfonyl)-phenyl | 3-(β-sulfatoethyl-sulfonyl)-phenyl + 3-(vinylsulfonyl)-phenyl | chlorine | 3-sulfo-phenyl | 65:35 | yellowish-tinged red |
| 83 | 3-(β-sulfato-ethylsulfonyl)-phenyl | chlorine | 4-(β-sulfato-ethylsulfonyl)-phenyl + 4-(vinylsulfonyl)-phenyl | 3-(β-sulfatoethyl-sulfonyl)-phenyl + 3-(vinylsulfonyl)-phenyl | chlorine | 3-sulfo-phenyl | 40:60 | yellowish-tinged red |
| 84 | 3-(β-sulfato-ethylsulfonyl)-phenyl | chlorine | 4-(β-sulfato-ethylsulfonyl)-phenyl + 4-(vinylsulfonyl)-phenyl | 3-(β-sulfatoethyl-sulfonyl)-phenyl | chlorine | 3-sulfo-phenyl | 70:30 | yellowish-tinged red |
| 85 | 4-(β-sulfato-ethylsulfonyl)-phenyl + 4-(vinylsulfonyl)-phenyl | chlorine | 4-(β-sulfato-ethylsulfon-yl)-phenyl | 3-(β-sulfatoethyl-sulfonyl)-phenyl | chlorine | 3-sulfo-phenyl | 70:30 | red |
| 86 | 4-(β-sulfato-ethylsulfonyl)-phenyl + 4-(vinylsulfonyl)-phenyl | chlorine | 4-(β-sulfato-ethylsulfon-yl)-phenyl | 3-(β-sulfatoethyl-sulfonyl)-phenyl ' 3-(vinylsulfonyl)-phenyl | chlorine | 3-sulfo-phenyl | 70:30 | red |
| 87 | 4-(β-sulfato-ethylsulfonyl)-phenyl | chlorine | 4-(β-sulfato-ethylsulfon-yl)-phenyl | 3-(β-sulfatoethyl-sulfonyl)-phenyl + 3-(vinylsulfonyl)-phenyl | chlorine | 3-sulfo-phenyl | 70:30 | red |
| 88 | 4-(β-sulfato-ethylsulfonyl)-phenyl | chlorine | 3-(β-sulfato-ethylsulfonyl)-phenyl + 3-(vinylsulfonyl)-phenyl | 3-(β-sulfatoethyl-sulfonyl)-phenyl + 3-(vinylsulfonyl)-phenyl | chlorine | 3-sulfo-phenyl | 80:20 | red |
| 89 | 4-(β-sulfato-ethylsulfonyl)-phenyl | chlorine | 3-(β-sulfato-ethylsulfonyl)-phenyl + 3-(vinylsulfonyl)-phenyl | 3-(β-sulfatoethyl-sulfonyl)-phenyl + 3-(vinylsulfonyl)-phenyl | chlorine | 3-sulfo-phenyl | 40:60 | yellowish-tinged red |

-continued

| | Dyestuff (1A) | | | Dyestuff (2A) | | | | |
| --- | --- | --- | --- | --- | --- | --- | --- | --- |
| Ex. | Radical $D^1$ | Radical $X^1$ | Radical A | Radical $D^2$ | Radical $X^2$ | Radical B | WR | Color shade |
| 90 | 4-(β-sulfato-ethylsulfonyl)-phenyl | chlorine | 3-(β-sulfato-ethylsulfonyl)-phenyl + 3-(vinylsulfonyl)-phenyl | 3-(β-sulfatoethyl-sulfonyl)-phenyl | chlorine | 3-sulfo-phenyl | 60:40 | red |
| 91 | 3-(β-sulfato-ethylsulfonyl)-phenyl + 3-(vinylsulfonyl)-phenyl | chlorine | 4-(β-sulfato-ethylsulfon-yl)-phenyl | 4-(β-sulfatoethyl-sulfonyl)-phenyl | chlorine | 3-sulfo-phenyl | 35:65 | red |
| 92 | 3-(β-sulfato-ethylsulfonyl)-phenyl + 3-(vinylsulfonyl)-phenyl | chlorine | 4-(β-sulfato-ethylsulfon-yl)-phenyl | 4-(β-sulfato-ethylsulfonyl-phenyl + 4-(vinylsulfonyl)-phenyl | chlorine | 3-sulfo-phenyl | 35:65 | red |
| 93 | 3-(β-sulfato-ethylsulfonyl)-phenyl | chlorine | 4-(β-sulfato-ethylsulfon-yl)-phenyl | 4-(β-sulfato-ethylsulfonyl-phenyl + 4-(vinylsulfonyl)-phenyl | chlorine | 3-sulfo-phenyl | 35:65 | red |
| 94 | 3-(β-sulfato-ethylsulfonyl)-phenyl | chlorine | 4-(β-sulfato-ethylsulfonyl)-phenyl + 4-(vinylsulfonyl)-phenyl | 4-(β-sulfato-ethylsulfonyl-phenyl + 4-(vinylsulfonyl)-phenyl | chlorine | 3-sulfo-phenyl | 35:65 | red |
| 95 | 3-(β-sulfato-ethylsulfonyl)-phenyl | chlorine | 4-(β-sulfato-ethylsulfonyl)-phenyl + 4-(vinylsulfonyl)-phenyl | 4-(β-sulfato-ethylsulfonyl-phenyl + 4-(vinylsulfonyl)-phenyl | chlorine | 3-sulfo-phenyl | 50:50 | red |
| 96 | 3-(β-sulfato-ethylsulfonyl)-phenyl | chlorine | 4-(β-sulfato-ethylsulfonyl)-phenyl + 4-(vinylsulfonyl)-phenyl | 4-(β-sulfato-ethylsulfonyl-phenyl | chlorine | 3-sulfo-phenyl | 35:65 | red |
| 97 | 4-(β-sulfato-ethylsulfonyl)-phenyl | chlorine | 3-(β-sulfato-ethylsulfonyl)-phenyl + 3-(vinylsulfonyl)-phenyl | 4-(β-sulfatoethyl-sulfonyl)-phenyl | chlorine | 3-sulfo-phenyl | 60:40 | red |
| 98 | 4-(β-sulfato-ethylsulfonyl)-phenyl | chlorine | 3-(β-sulfato-ethylsulfonyl)-phenyl + 3-(vinylsulfonyl)-phenyl | 4-(β-sulfatoethyl-sulfonyl)-phenyl | chlorine | 4-sulfo-phenyl | 70:30 | red |
| 99 | 4-(β-sulfato-ethylsulfonyl)-phenyl | chlorine | 3-(β-sulfato-ethylsulfonyl)-phenyl + 3-(vinylsulfonyl)-phenyl | 3-(β-sulfatoethyl-sulfonyl)-phenyl | chlorine | 4-sulfo-phenyl | 80:20 | red |
| 100 | 3-(β-sulfato-ethylsulfonyl)-phenyl + 3-(vinylsulfonyl)-phenyl | chlorine | 4-(β-sulfato-ethylsulfonyl)-phenyl | 4-(β-sulfatoethyl-sulfonyl)-phenyl | chlorine | 4-sulfo-phenyl | 75:25 | yellowish-tinged red |
| 101 | 3-(β-sulfato-ethylsulfonyl)-phenyl + 3-(vinylsulfonyl)-phenyl | chlorine | 4-(β-sulfato-ethylsulfonyl)-phenyl | 4-(β-sulfato-ethyl-sulfonyl)-phenyl + 4-(vinylsulfonyl)-phenyl | chlorine | 4-sulfo-phenyl | 75:25 | yellowish-tinged red |
| 102 | 3-(β-sulfato-ethylsulfonyl)-phenyl | chlorine | 4-(β-sulfato-ethylsulfonyl)-phenyl | 4-(β-sulfato-ethyl-sulfonyl)-phenyl + 4-(vinylsulfonyl)-phenyl | chlorine | 4-sulfo-phenyl | 75:25 | yellowish-tinged red |
| 103 | 3-(β-sulfato-ethylsulfonyl)-phenyl | chlorine | 4-(β-sulfato-ethylsulfonyl)-phenyl + 4-(vinylsulfonyl)-phenyl | 4-(β-sulfato-ethyl-sulfonyl)-phenyl + 4-(vinylsulfonyl)-phenyl | chlorine | 4-sulfo-phenyl | 60:40 | red |
| 104 | 3-(β-sulfato-ethylsulfonyl)-phenyl | chlorine | 4-(β-sulfato-ethylsulfonyl)-phenyl + 4-(vinylsulfonyl)-phenyl | 4-(β-sulfato-ethyl-sulfonyl)-phenyl + 4-(vinylsulfonyl)-phenyl | chlorine | 4-sulfo-phenyl | 40:60 | red |

-continued

| | Dyestuff (1A) | | | Dyestuff (2A) | | | | |
|---|---|---|---|---|---|---|---|---|
| Ex. | Radical $D^1$ | Radical $X^1$ | Radical A | Radical $D^2$ | Radical $X^2$ | Radical B | WR | Color shade |
| 105 | 3-(β-sulfato-ethylsulfonyl)-phenyl | chlorine | 4-(β-sulfato-ethylsulfonyl)-phenyl + 4-(vinylsulfonyl)-phenyl | 4-(β-sulfato-ethyl-sulfonyl)-phenyl | chlorine | 4-sulfo-phenyl | 40:60 | red |

We claim:

1. A dyestuff mixture comprising an effective amount of one or more azo dyestuffs corresponding to the formula (1) and an effective amount of one or more azo dyestuffs corresponding to the formula (2)

$$(1)$$

$$(2)$$

in which:

M is hydrogen or an alkali metal or the stoichiometric equivalent of an alkaline earth metal;

$D^1$ is the radical of a benzene or naphthalene nucleus;

$D^2$ has one of the meanings of $D^1$;

$R^1$ is hydrogen, alkyl having 1 to 4 carbon atoms or alkoxy having 1 to 4 carbon atoms if $D^1$ or $D^2$ is the radical of a benzene nucleus, or is hydrogen or sulfo if $D^1$ or $D^2$ is the radical of a naphthalene nucleus;

$R^2$ is hydrogen, alkyl having 1 to 4 carbon atoms, alkoxy having 1 to 4 carbon atoms or sulfo if $D^1$ or $D^2$ is the radical of a benzene nucleus, or is hydrogen or sulfo if $D^1$ or $D^2$ is the radical of a naphthalene nucleus;

$R^3$ is hydrogen, alkyl having 1 to 4 carbon atoms, or alkoxy having 1 to 4 carbon atoms;

$R^4$ is hydrogen, alkyl having 1 to 4 carbon atoms, or alkoxy having 1 to 4 carbon atoms;

$R^5$ is hydrogen, alkyl having 1 to 4 carbon atoms, alkoxy having 1 to 4 carbon atoms or sulfo;

$R^6$ is hydrogen, alkyl having 1 to 4 carbon atoms, or alkoxy having 1 to 4 carbon atoms;

$R^7$ is hydrogen, alkyl having 1 to 4 carbon atoms, alkoxy having 1 to 4 carbon atoms or sulfo;

R is hydrogen or alkyl having 1 to 4 carbon atoms;

$Y^1$ is vinyl, β-sulfatoethyl, β-thiosulfatoethyl or β-chloroethyl;

$Y^2$ has one of the meanings of $Y^1$;

$Y^3$ has one of the meanings of $Y^1$;

$X^1$ is bromine or chlorine;

$X^2$ has one of the meanings of $X^1$; and the group $—SO_2—Y^2$ is bonded to the benzene nucleus in the meta- or para- position relative to the amino group, and if $D^1$ or $D^2$ represent a benzene nucleus, the groups $—SO_2—Y^1$ and $—SO_2—Y^3$ are bonded to said benzene nucleus in the meta- or para- position relative to the azo group.

2. A dyestuff mixture as claimed in claim 1, comprising one or more azo dyestuffs corresponding to the formula (1) and one or more azo dyestuffs corresponding to the formula (2) in a mixing ratio of 90:10% by weight to 10:90% by weight.

3. A dyestuff mixture comprising one or more azo dyestuffs corresponding to the formula (1) and one or more azo dyestuffs corresponding to the formula (2) in a mixing ratio of 70:30% by weight to 30:70% by weight:

$$(1)$$

$$(2)$$

in which:

M is hydrogen or an alkali metal or the stoichiometric equivalent of an alkaline earth metal;

$D^1$ is the radical of a benzene or naphthalene nucleus;

$D^2$ has one of the meanings of $D^1$;

$R^1$ is hydrogen, alkyl having 1 to 4 carbon atoms or alkoxy having 1 to 4 carbon atoms if $D^1$ or $D^2$ is the radical of a benzene nucleus, or is hydrogen or sulfo if $D^1$ or $D^2$ is the radical of a naphthalene nucleus;

$R^2$ is hydrogen, alkyl having 1 to 4 carbon atoms, alkoxy having 1 to 4 carbon atoms or sulfo if $D^1$ or $D^2$ is the radical of a benzene nucleus, or is hydrogen or sulfo if $D^1$ or $D^2$ is the radical of a naphthalene nucleus;

$R^3$ is hydrogen, alkyl having 1 to 4 carbon atoms, or alkoxy having 1 to 4 carbon atoms;

$R^4$ is hydrogen, alkyl having 1 to 4 carbon atoms, or alkoxy having 1 to 4 carbon atoms;

$R^5$ is hydrogen, alkyl having 1 to 4 carbon atoms, alkoxy having 1 to 4 carbon atoms or sulfo;

$R^6$ is hydrogen, alkyl having 1 to 4 carbon atoms, or alkoxy having 1 to 4 carbon atoms;

$R^7$ is hydrogen, alkyl having 1 to 4 carbon atoms, alkoxy having 1 to 4 carbon atoms or sulfo;

R is hydrogen or alkyl having 1 to 4 carbon atoms;

$Y^1$ is vinyl, β-sulfatoethyl, β-thiosulfatoethyl or β-chloroethyl;

$Y^2$ has one of the meanings of $Y^1$;

$Y^3$ has one of the meanings of $Y^1$;

$X^1$ is bromine or chlorine;

$X^2$ has one of the meanings of $X^1$; and the group —$SO_2$—$Y^2$ is bonded to the benzene nucleus in the meta- or para- position relative to the amino group, and if $D^1$ or $D^2$ represent a benzene nucleus, the groups —$SO_2$—$Y^1$ and —$SO_2Y^3$ are bonded to said benzene nucleus in the meta- or para- position relative to the azo group.

4. A dyestuff mixture as claimed in claim 1, comprising one or more azo dyestuffs corresponding to the formula (1) and one or more azo dyestuffs corresponding to the formula (2) in a mixing ratio of 55:45% by weight to 45:55% by weight.

5. A dyestuff mixture as claimed in claim 1, in which, in the dyestuffs of the formulae (1) and (2), the radical R is hydrogen.

6. A dyestuff mixture as claimed in claim 1, in which $D^1$ and $D^2$ are both the radical of a benzene nucleus.

7. A dyestuff mixture as claimed in claim 6, in which $R^1$ is hydrogen, methoxy or methyl, $R^2$ is hydrogen or methoxy, $R^4$ is hydrogen, methoxy or methyl, $R^5$ is hydrogen or methoxy and $Y^1$ and $Y^3$ independently of one another are vinyl or β-sulfatoethyl.

8. A dyestuff mixture as claimed in claim 1, in which $X^1$ and $X^2$ are both chlorine.

9. A dyestuff mixture as claimed in claim 1, in which $R^6$ is hydrogen and $R^7$ is hydrogen or sulfo.

10. A dyestuff mixture as claimed in claim 1, in which $R^3$ is hydrogen and $Y^2$ is vinyl or β-sulfatoethyl.

* * * * *